United States Patent
Yeung

(10) Patent No.: US 6,842,652 B2
(45) Date of Patent: Jan. 11, 2005

(54) IMAGE CAPTURE DEVICE

(75) Inventor: Chi Ping Yeung, Hong Kong (CN)

(73) Assignee: Concord Camera Corp., Hollywood, FL (US)

( * ) Notice: Subject to any disclaimer, the term of this patent is extended or adjusted under 35 U.S.C. 154(b) by 506 days.

(21) Appl. No.: 10/081,677

(22) Filed: Feb. 22, 2002

(65) Prior Publication Data

US 2003/0163623 A1 Aug. 28, 2003

(51) Int. Cl.[7] ............................................. G05B 19/18
(52) U.S. Cl. .............................. 700/65; 700/1; 700/66; 700/17; 700/83; 348/207; 348/143; 348/231; 348/333.05; 348/373; 250/201.2; 250/201.5; 250/234; 250/235
(58) Field of Search ................................ 700/1, 17, 65, 700/66, 83; 250/201.2, 201.5, 234, 325; 348/207, 143, 231, 333.05, 373

(56) References Cited

U.S. PATENT DOCUMENTS

| | | | |
|---|---|---|---|
| 4,937,676 A | | 6/1990 | Finelli et al. |
| 5,867,218 A | | 2/1999 | Matsuzaki et al. |
| 6,102,505 A | * | 8/2000 | McIntyre et al. ............... 347/2 |
| 6,118,485 A | | 9/2000 | Hinoue et al. |
| 6,229,565 B1 | * | 5/2001 | Bobry .................... 348/207.99 |
| D449,848 S | | 10/2001 | Lewis, Jr. et al. |
| 6,689,998 B1 | * | 2/2004 | Bremer ..................... 250/201.2 |
| 2001/0009437 A1 | * | 7/2001 | Klein et al. .................. 348/207 |
| 2002/0101512 A1 | * | 8/2002 | Klapman et al. ........... 348/207 |

OTHER PUBLICATIONS

Palmpix Camera for the M500 Handheld Series, www.kodak.com/US/en/digital/cameras/palmpix/m500, Dec. 26, 2001.
Casio Digital Camera Card for the Casio Cassiopeia E-100/105, www.microsoft.com/windowsce/uplink/review, Dec. 14, 2001.
JK-710DC Digital Camera Card, www.casio.com/accessories, Dec. 27, 2001.
Accessories from Casio for Cassiopeia Pocket PCs, www.pocketpcmag.com, Dec. 14, 2001.
To-Tech First Impressions: Casio Compact Flash Digital Camera Card (Model JK-710D), www.to-tech.com, Dec. 14, 2001.
Casio Digital Camera Card Model JK-710DC, www.zdnet.com/products/stories/reviews, Dec. 14, 2001.

* cited by examiner

Primary Examiner—Ramesh Patel
(74) Attorney, Agent, or Firm—Scott L. Lampert; Kerry Sisselman

(57) ABSTRACT

An image capture device is provided, a portion of which is insertable into an expansion slot of a handheld PC or PDA device, which is configured like a camera familiar to the user. In one embodiment, the image capture device includes a lens unit that is rotatable over about 180 ° degrees. The image capture device additionally includes an optical viewfinder rotatable with the lens unit. The image capture device advantageously includes an indicator visible from either side of the image capture device regardless of the lens position.

9 Claims, 9 Drawing Sheets

IMAGE CAPTURE DEVICE

FIELD OF THE INVENTION

The present invention relates to the field of image capture devices, and more particularly, to an image capture device useful with a handheld computer or personal digital assistant ("PDA") device.

BACKGROUND OF THE INVENTION

It is presently common for individuals to utilize PDAs, such as the VISOR by HANDSPRING and the PALM PDA, or handheld PCs, such as the JORNADA by HEWLETT PACKARD and the CASSIOPEIA by CASIO. Many of these portable devices include an expansion port for use with optional external devices. Some companies are currently marketing image capture devices for use with these portable PDAs and PCs. For example, U.S. Pat. No. 6,118,485 to Hinoue et al. assigned at issue to Sharp Kabushiki Kaisha, discloses a card type camera that is used in connection with an information processing device such as electronic notebooks or other portable information equipment, personal word processors, and personal computers. In one embodiment of the invention of the '485 patent, the direction of the lens is changeable.

Additionally, CASIO has marketed the JK-710DC digital camera card for insertion into CASIO palm-size PC products. The JK-710DC digital camera card module is a small, light cylinder with a tiny lens in the middle and a Compact-Flash interface on the bottom that plugs into the top of the Cassiopeia PDA. A cylindrical housing member containing the CCD lens can swivel 180 degrees. Recording is initiated by pressing the PDA stylus to the touch-screen shutter button on the display of the PDA or by pressing a silver button on the side of the PDA.

The currently available image capture devices used with a handheld PC or PDA device are not configured like conventional cameras and, therefore, may not be familiar to the user. Among other differences, the prior art image capture devices use the screen of the PDA in lieu of a conventional camera viewfinder. The prior art image capture devices additionally use a button or touch screen on the PDA in lieu of a physical trigger button on the image capture device.

Also, it is useful to have a status indicator on the image capture device itself that is immediately visible to the user or target of the image capture device, regardless of the position of the image capture device lens assembly.

What is needed is an image capture device that is familiar in operation to a user. What is additionally needed is an image capture device that includes a viewfinder on the image capture device unit that is accessible to the user when the image capture device is mated with the handheld device.

What is further needed is an indicator on the image capture device that is visible when the image capture device rotatable lens assembly is in any position.

These and other objects and advantages of the present invention will become more readily apparent in the description that follows.

SUMMARY OF THE INVENTION

What is provided is an image capture device, a portion of which is insertable into an expansion slot of a handheld PC or PDA device, which includes conventional camera features familiar to the user. In one embodiment, the image capture device includes a lens unit that is rotatable over about 180 degrees. The image capture device additionally includes an optical viewfinder that, in one particular embodiment, is rotatable with the lens unit. The image capture device advantageously includes an indicator visible from either side of the image capture device regardless of the lens position.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred, it being understood, however, that the invention is not limited to the specific methods and instrumentality's disclosed. In the drawings.

DETAILED DESCRIPTION OF THE PREFERRED EMBODIMENTS

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Figure 1A:
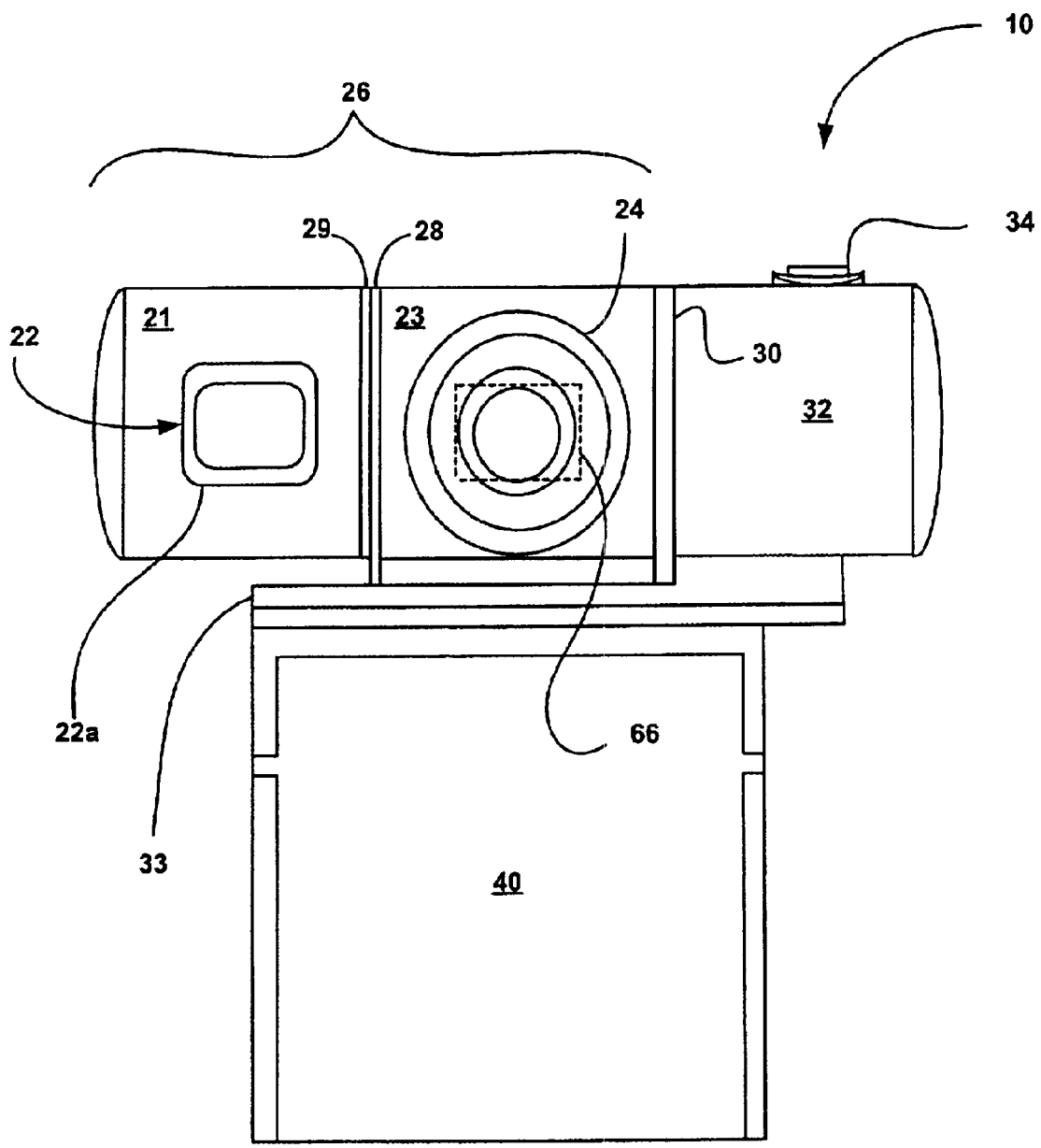
FIG. 1A is a front plan view of an image capture device of one embodiment of the present invention.
Figure 1B:
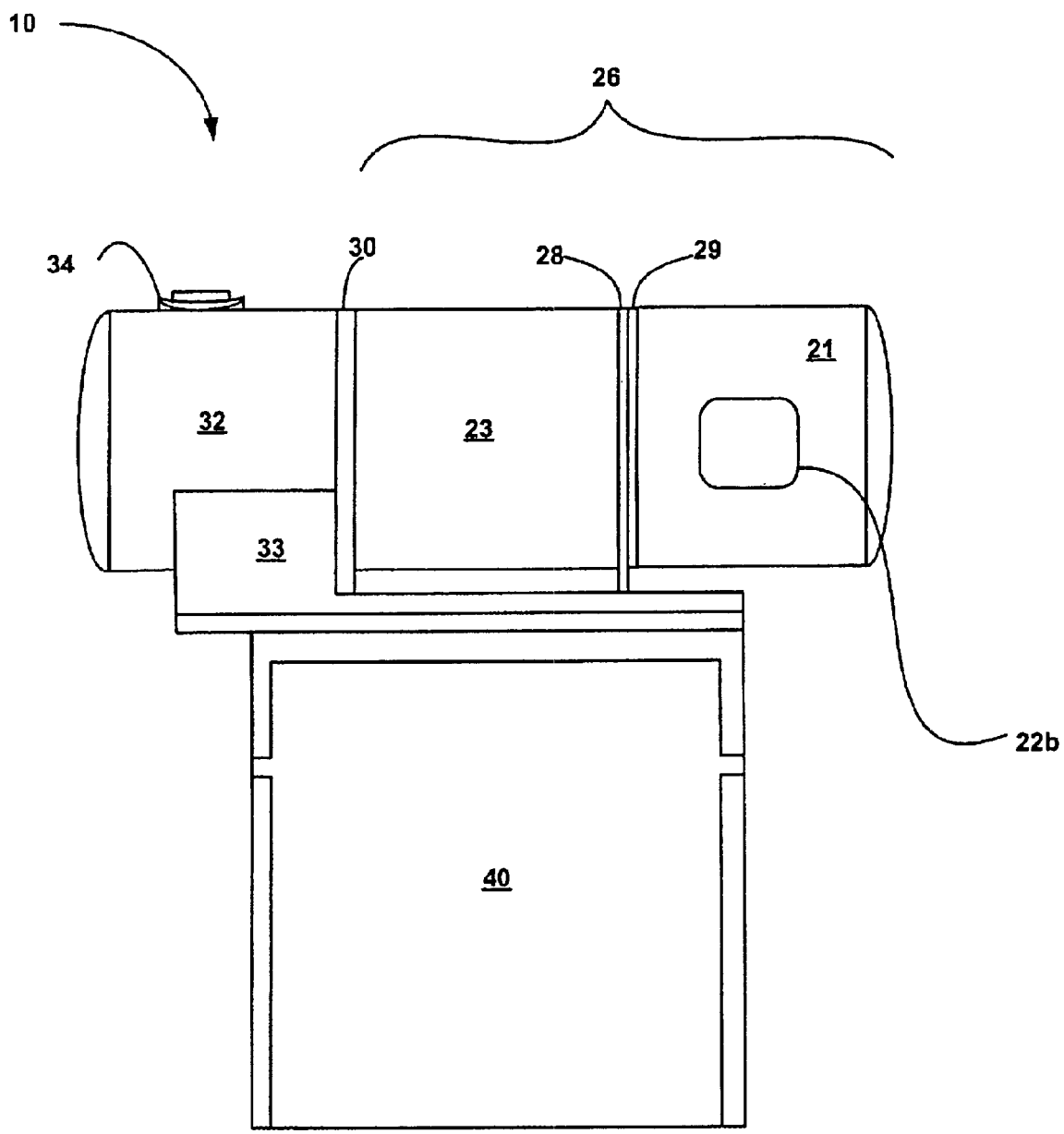
FIG. 1B is a rear plan view of the image capture device of FIG. 1A.

Referring now to FIGS. 1A and 1B, there is shown an image capture device 10 in accordance with one embodiment of the present invention. The image capture device 10 includes an optical portion and a processor/interface portion. The optical portion comprises a viewfinder portion 21 and an image capture portion 23 (together "the swivel unit 26") and a fixed portion 32. The optical portion is configured to resemble a more traditional camera, including a viewfinder and/or a trigger button 34 thereon.

The processor/interface portion 40 is adapted to fit into the expansion slot of a portable handheld device, such as a PALM handheld computer or a personal digital assistant (PDA). For example, the processor/interface portion 40 may be adapted to fit a CompactFlash, MultiMediaCard or Secure Digital port, such as are included on the Casio Cassiopeia or the Hewlett Packard Jornada.

The viewfinder portion 21 includes a reverse Galilean viewfinder assembly 22. An ocular lens 22a is aligned with the objective lens 22b defining a viewfinder optical axis therethrough. Using the optical viewfinder to frame shots instead of using the screen of the device provides a familiar interface to the user, as well as saves power. Further, it has been found that it is difficult to see the display of the portable device in bright natural sunlight conditions outdoors, often times rendering image capture devices without a conventional optical viewfinder unusable. the inclusion of the optical viewfinder 22 of the present invention expands the users ability to capture images over the prior art devices by enabling the user to frame images when outdoors in bright ambient light.

The image capture portion 23 includes the taking lens 24. As will be described in more detail herein, an optical sensor 66 is seated behind the taking lens 24 to capture the scene in response to a user instruction. The optical sensor 66 may be a CMOS or CCD sensor, or may be another type of optical sensor.

In the present embodiment, the viewfinder portion 21 and the image capture portion 23 are bound together, forming a swivel unit 26. The swivel unit 26 is rotatably connected at one end to the fixed portion 32.

Fixed portion 32 includes the physical trigger button 34. Trigger button 34 may be pressed by the user to instruct the processor to capture and store an image received by the optical sensor. Alternatively or in addition to the trigger button 34, the software stored in the portable device may create a virtual or "soft" trigger button on the display of the portable device. This "soft" trigger button may be used instead of the trigger button 34 to capture an image. Fixed portion 32 is fixed to the processor/interface portion 40 at the base 33. Swivel unit 26 is configured so as to be able to rotate 180° relative to the fixed portion 32. Additionally, the swivel unit 26, and correspondingly the taking lens 24, may be stopped anywhere along its path of rotation so that the lens may be directed in any direction along the 180° arc of rotation. Alternately, the swivel unit 26 may only permit the swivel unit to be stopped at discrete points along the 180° arc of rotation.

To provide additional support for the swivel unit 26, a bracket 28 may be connected between the viewfinder portion 21 and the image capture portion 23 and the processor/interface portion 40. A washer or grommet 29 is optionally connected between the viewfinder portion 21 and the bracket 28 to ensure that the viewfinder portion 21 can easily swivel with the image capture portion 23.

The swivel unit 26 of the present embodiment is preferably generally cylindrical to permit the swivel unit 26 to rotate while maintaining a minimum of space between the swivel portion 26 and the base portion 33.

Additionally, the image capture device 10 of the present invention includes a light indicator. Light indicator includes a generally disc shaped light pipe 30 made from a light transmissive material, such as plastic. The light indicator is visible from all angles of the image capture device 10 and is used to communicate the status of image capture device 10 to the user. In one particular embodiment of the present invention, the image capture device 10 in standby (power-saving) mode is represented by the light indicator blinking slowly. When the light is solid, the image capture device 10 is ready to take a picture. When the light is blinking quickly, the image capture device 10 is busy. In the present embodiment, the generally disc shaped light pipe 30 is seated between the swivel unit 26 and the fixed portion 32.

Figure 2:
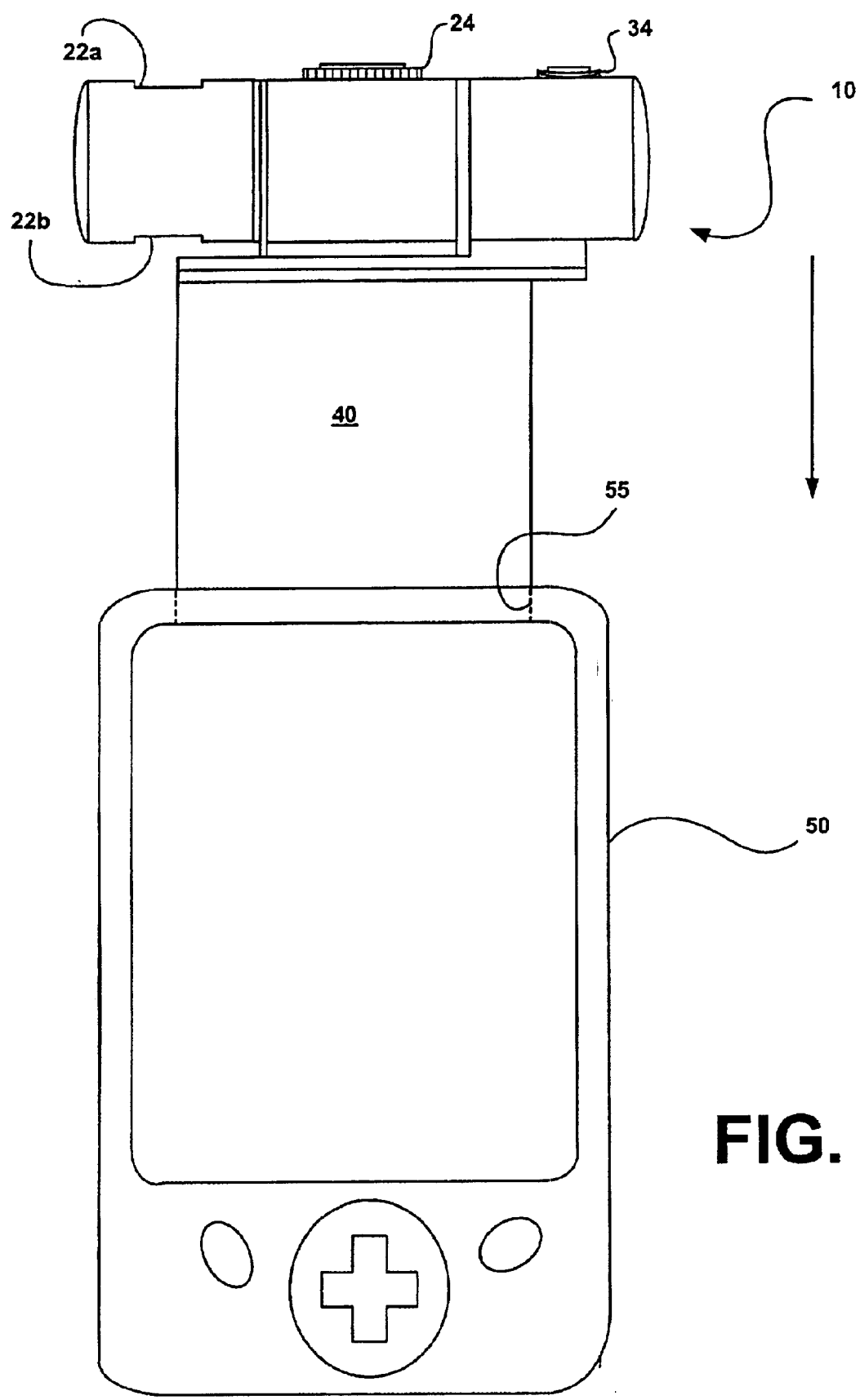
FIGS. 2–3 is a front plan view of an image capture device in accordance with one embodiment of the present invention being used with a portable device.
Figure 3:
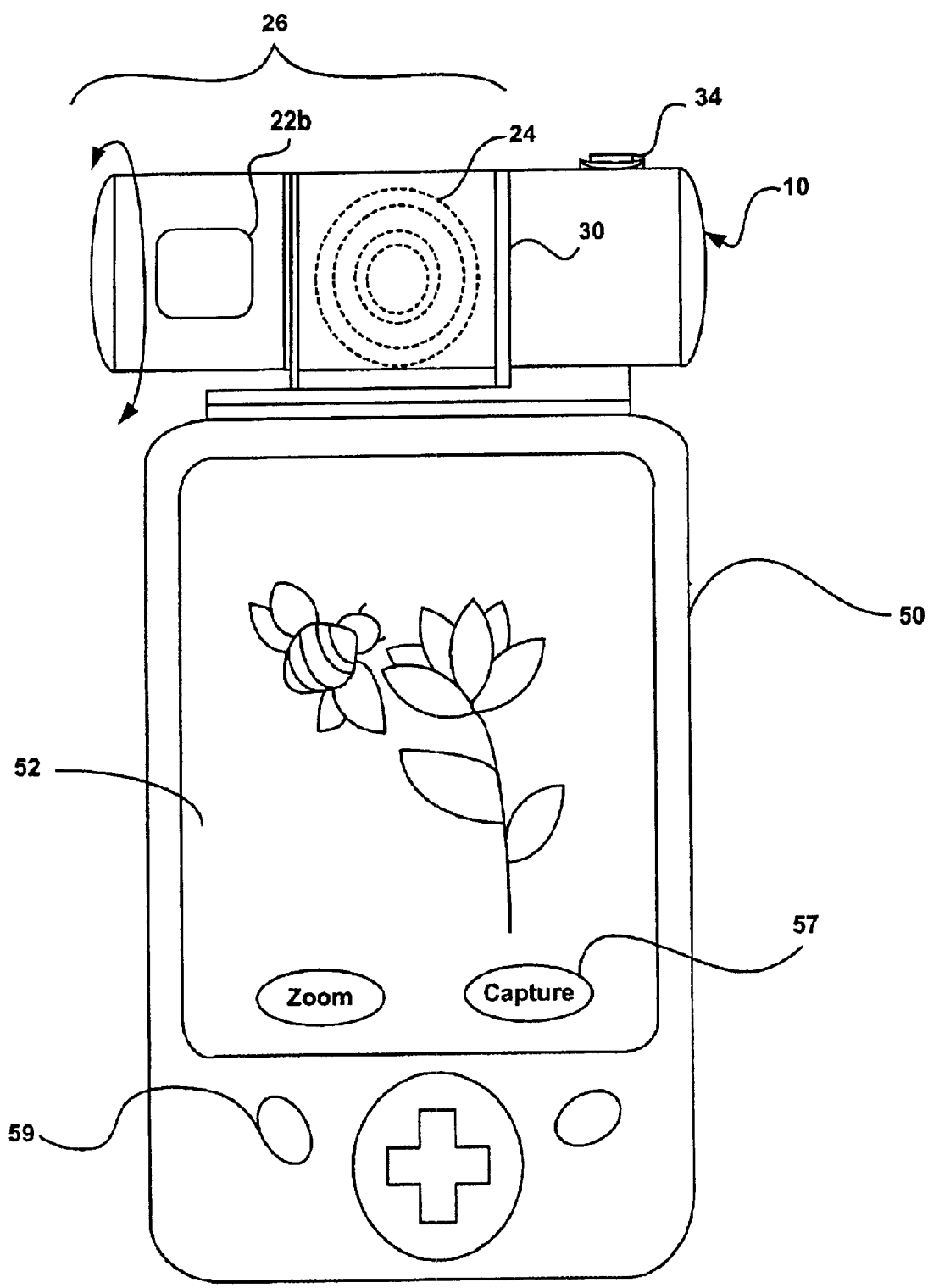

Referring now to FIGS. 2 and 3, there is shown a handheld appliance 50, such as a personal PC or a PDA, having an expansion slot 55. The processor/interface portion 40 of the image capture device 10 is sized to slide into the expansion slot 55 until the processor/interface portion 40 is seated in the expansion slot 55 and is mated with the expansion slot connector. In one particular embodiment of the present invention, the swivel unit 26 is set to the 90 position with the taking lens 24 directed 180 away from the expansion slot 55 during insertion. The swivel unit 26 may then be turned clockwise or counter clockwise to direct the taking lens 24 away from or towards the user.

Referring more particularly to FIG. 3, once seated in the expansion slot 55 of the handheld appliance 50, the image capture device 10 can be used to capture an image observed through the viewfinder 22 or viewed on the display 52. To capture an image, the user can swivel the swivel unit 26 so that the lens 24 points away from the display 52 of the handheld appliance 50. Alternately, the swivel unit 26 may be swiveled such that the lens 24 is pointed towards the user, for taking self-portraits. Additionally, if the handheld appliance 50 includes a cellular telephone incorporated therein, such as the Samsung SPHI300 cellular phone/PDA, the taking lens 24 may be directed towards the user to facilitate video conferencing, when the image capture software is in continuous video mode (about 15 frames per second). Additionally, the person taking the picture may sight through the viewfinder while the PDA screen is pointed away from the person taking the picture and towards the person being photographed. In this way the person being photographed can see the image being framed on the PDA while the person taking the picture uses the viewfinder on the image capture unit.

When the lens 24 is directed away from the user, the image to be captured can be framed using either the viewfinder ocular lens 22b or by viewing the image in real time on the display 52 of the handheld appliance 50. The user can capture the image by pressing the physical trigger button 34 or the soft trigger 57 on the touch sensitive display 52. Alternately, a physical button on the handheld appliance 50, such as button 59 may be used to capture the image.

In the preferred embodiment, the images are stored in the memory of the handheld appliance 50. In this way, the pictures are made available to the handheld appliance 50 even after the image capture device 10 is removed. This further minimizes the size and cost of the image capture device 10. However, this is not meant to be limiting. The image capture device 10 may include some form of memory thereon, i.e. flash memory, for storage of the captured images therein.

Similarly, in the preferred embodiment, image capture device 10 draws power directly from the power source for the handheld appliance. However, if desired, the image capture device 10 could be powered by its own power source, i.e. a small battery, a solar cell. Additionally, the image capture device may further include a source of scene illumination, such as a flash.

Figure 4:
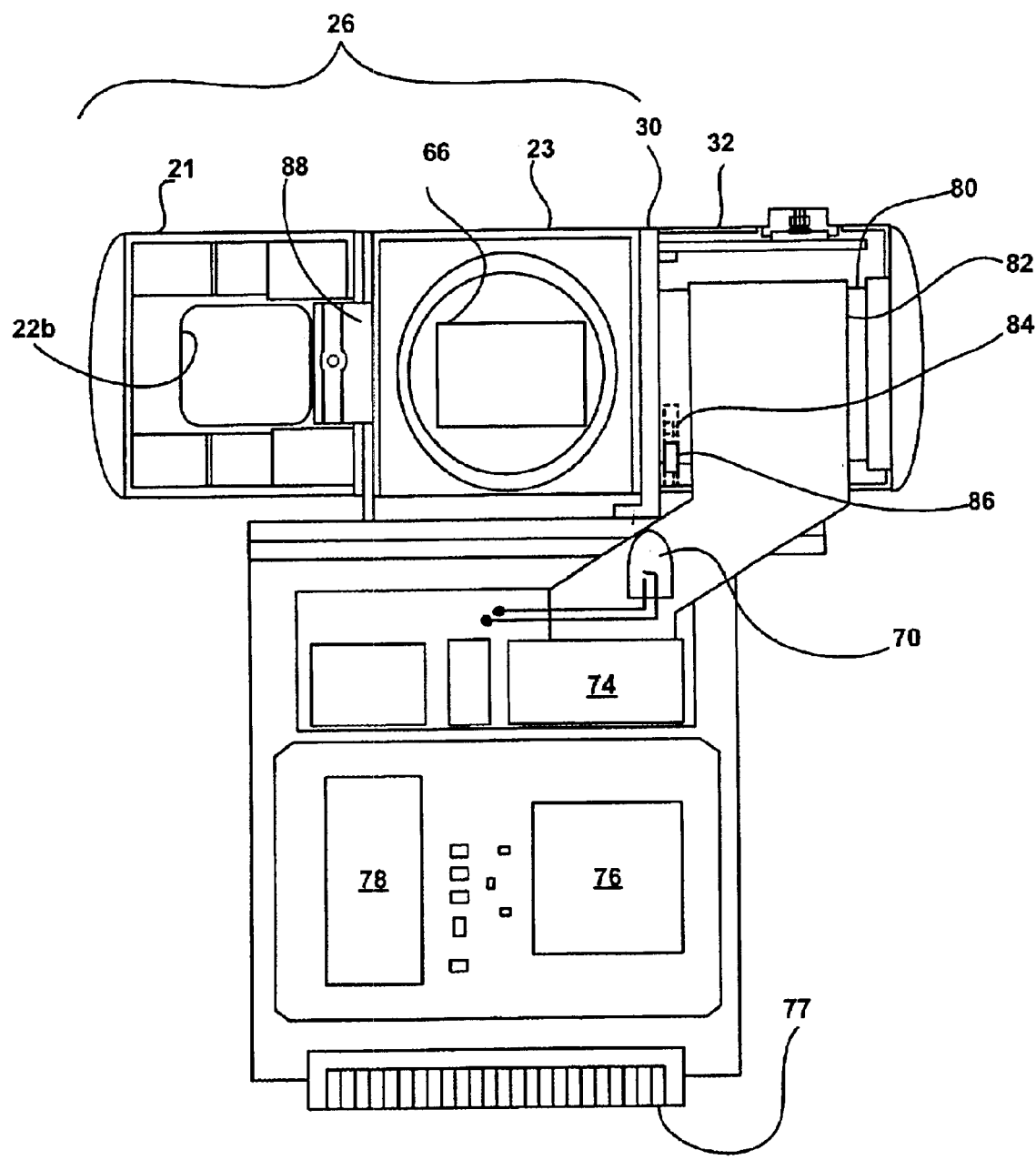
FIG. 4 is a front cross sectional view of an image capture device in accordance with one embodiment of the present invention.
Figures 5A, 5B:
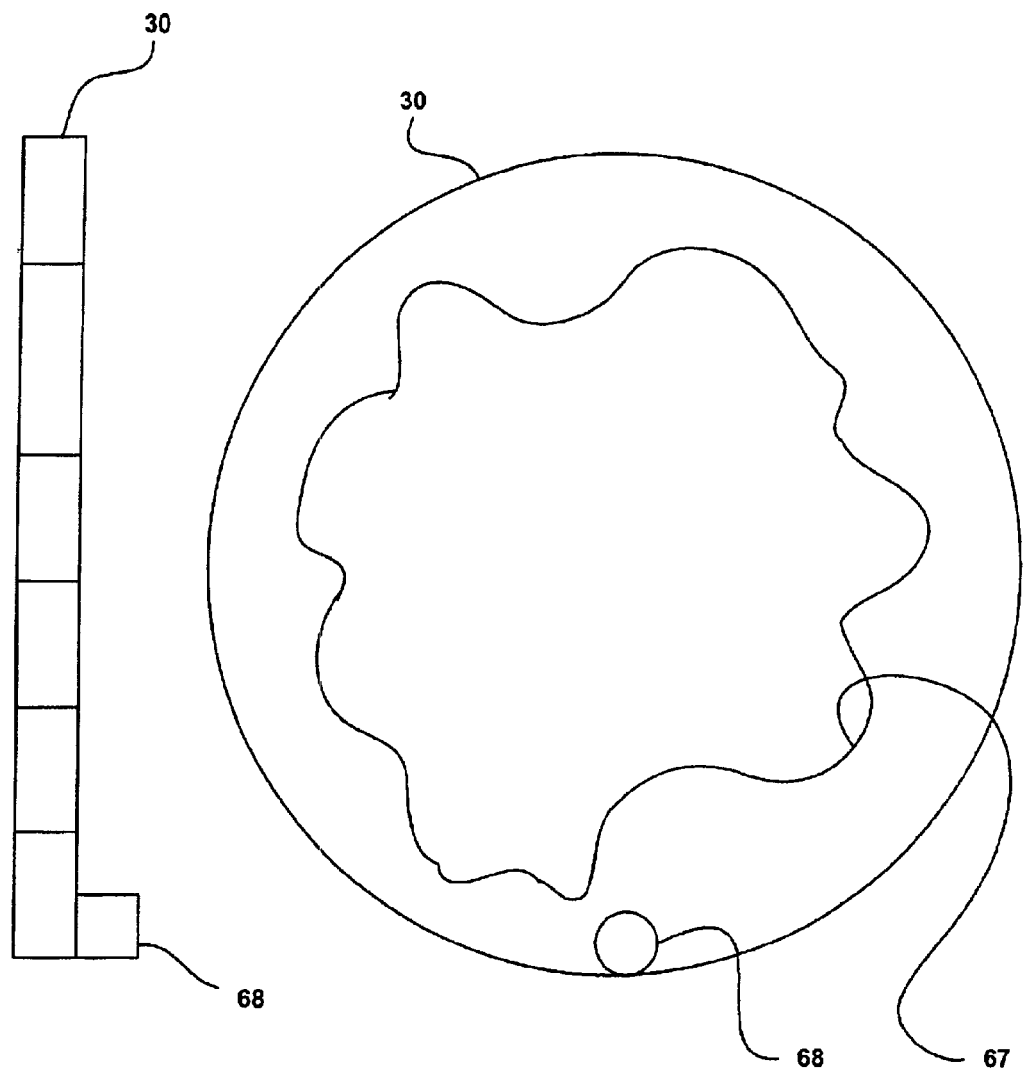
FIG. 5A is a front plan view of the light indicator used in one embodiment of the present invention.
FIG. 5B is a side plan view of the light indicator of FIG. 5A.
Figure 6:
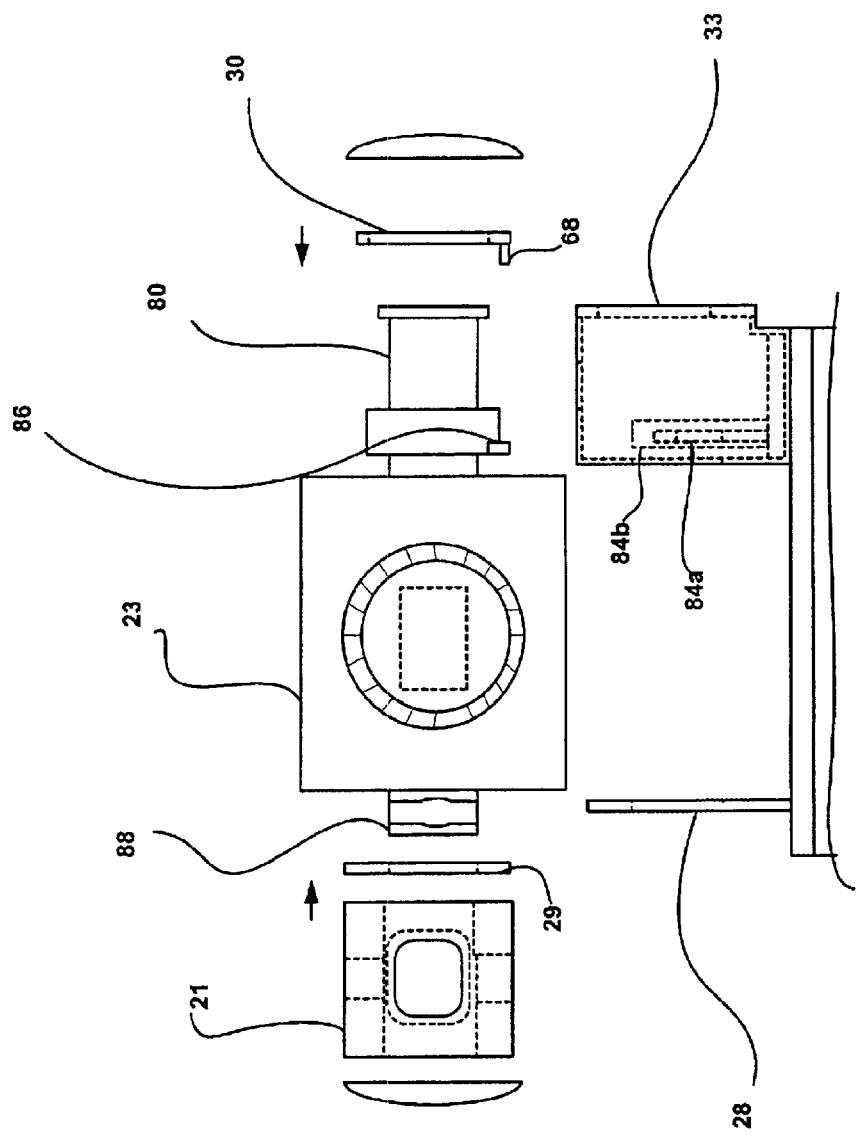
FIG. 6 is an exploded cross sectional view of a portion of the image capture device of FIG. 4.

Referring now to FIGS. 4–6, the image capture device 10 includes at its center, the image capture portion 23. Image capture portion 23 includes an image sensor 66 affixed to a PC board in the optical path behind the taking lens 24. Image data obtained by the image sensor 66 when the user activates the physical trigger button 34 or the soft trigger 57 is sent to a processor 76 on the processor/interface portion 40 via the data cable 82 and bus 74. The processed image may be stored in the frame buffer 78. A connector 77 is provided to communicate with the handheld appliance (50 of FIG. 2).

Extending outward from the end surfaces of the generally cylindrical image capture portion 23 are arm 88 and barrel 80. The viewfinder portion 21 comprises two half cylinders which tightly form a yoke around the arm 88 to fix the viewfinder portion 21 to the image capture portion 23. The bracket 28 and grommet 29 are slipped over the arm 88 prior to fixing the viewfinder portion 21 to the arm 88, during assembly.

The generally disc shaped light pipe 30 is placed over the barrel 80 in contact with the end surface of image capture portion 23 and is aligned over the light source for the indicator, i.e. light emitting diode (LED) 70. The barrel 80 is rotatably fixed to the fixed portion 33 such that protrusion 86 on the barrel 80 is aligned with the switch contacts 84*a* and 84*b*. When the swivel unit 26 is rotated, the protrusion 86 either opens or closes the switch contacts 84*a* and 84*b*, informing the processor 76 whether to invert the stored image.

The processor 76 additionally controls the actuation of the LED 70 pursuant to rules stored in ROM. When the LED 70 is actuated, light is visible from any angle relative to the image capture device 10 via the generally disc shaped light pipe 30.

Referring more specifically to FIGS. 5A and 5B, the inner circumference 67 of the generally disc shaped light pipe 30 is irregular and provides numerous internal reflection surfaces to better reflect the light from the LED 70. Additionally, a light transmissive arm 68 is appended to the generally disc shaped light pipe 30 for placement over the LED 70 to provide an extension to the light pipe 30 to allow for inexact tolerances when mounting the LED 70.

Figure 7A:
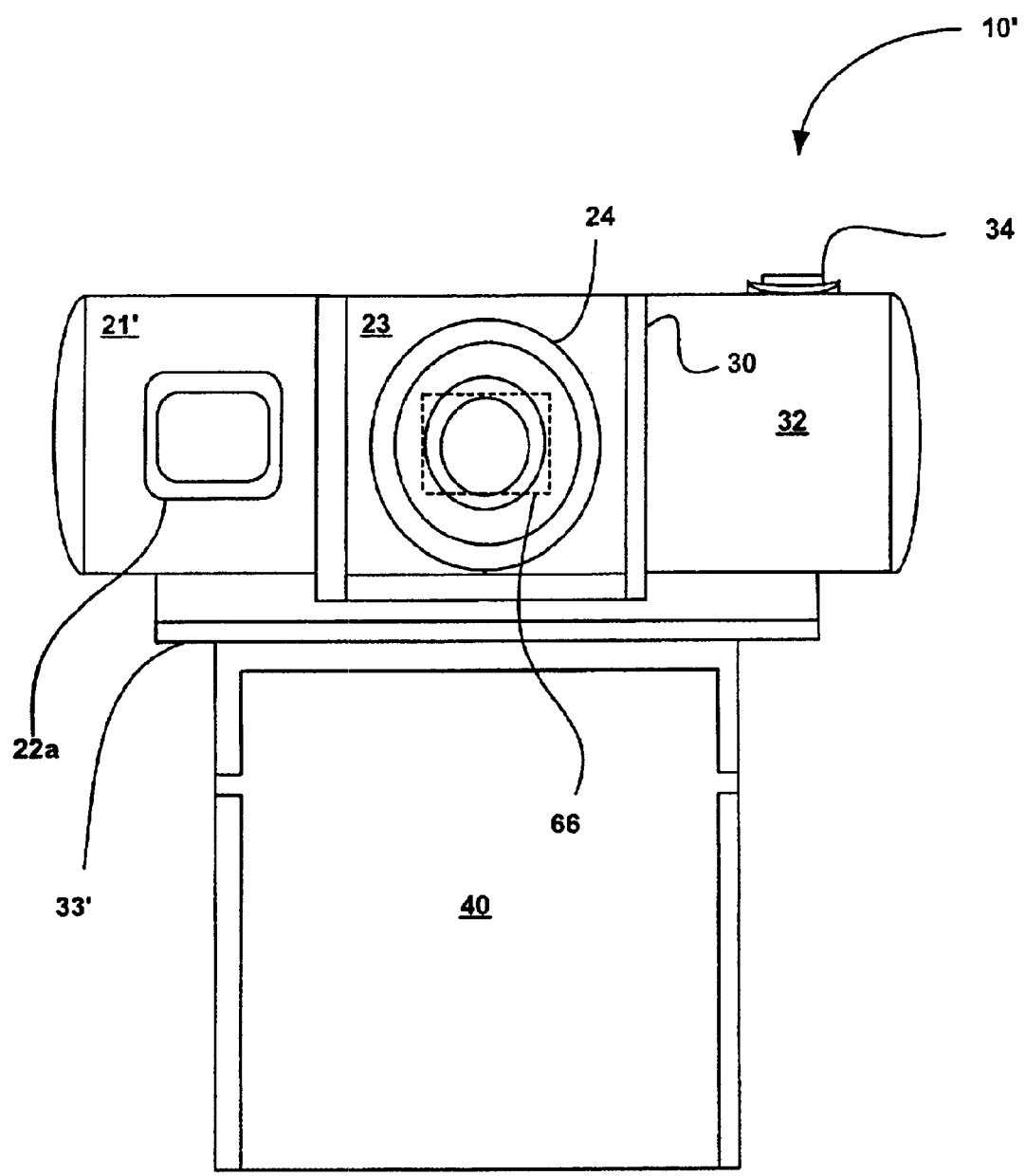
FIG. 7A is a front plan view of an image capture device in accordance with another embodiment of the present invention.
Figure 7B:
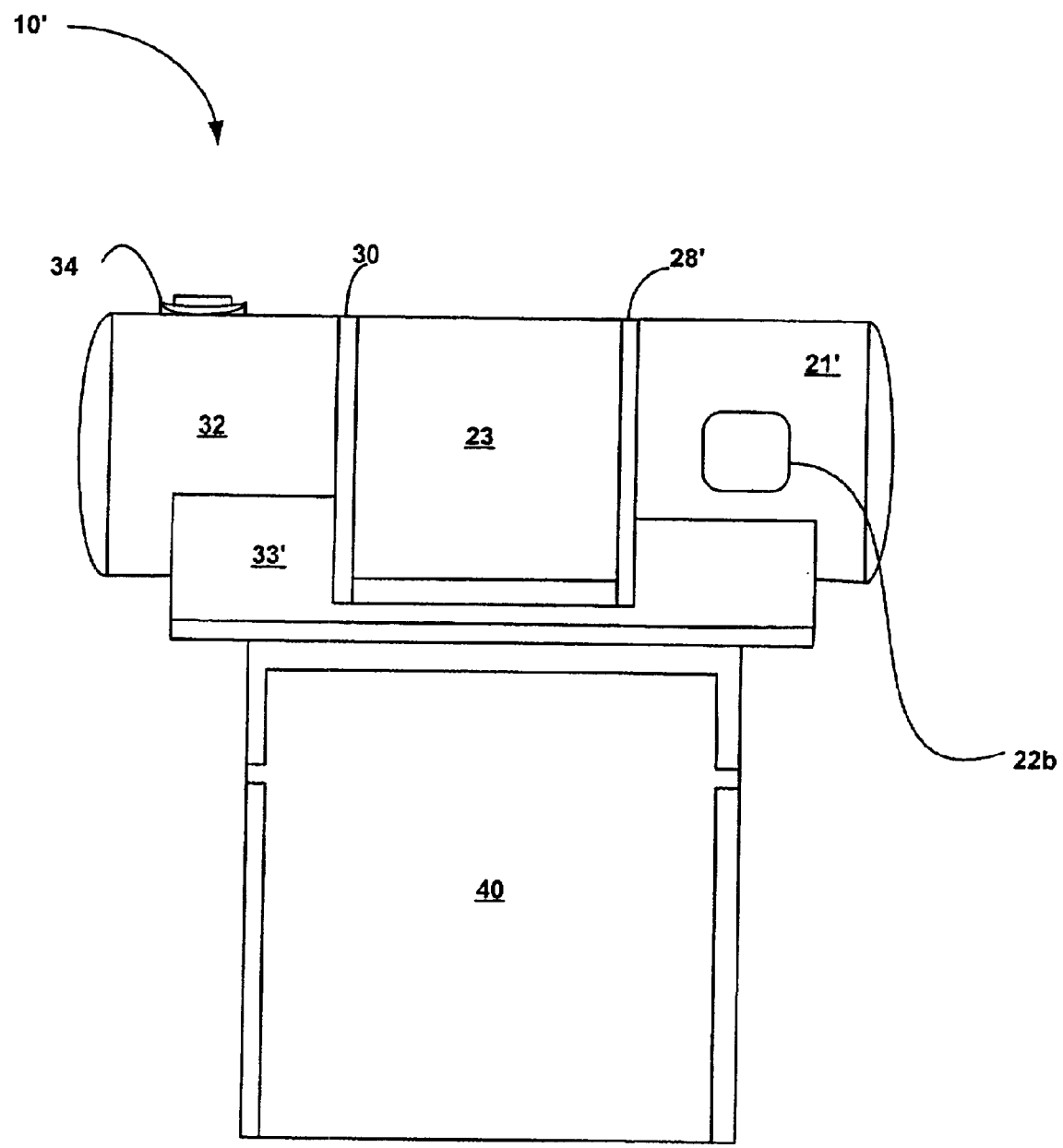
FIG. 7B is a rear plan view of the image capture device of FIG. 7A.

Referring now to FIGS. 7A and 7B, there is shown another embodiment of the present invention. The image capture device 10' includes an optical portion and a processor/interface portion 40, as described in connection with the image capture device 10 of FIGS. 1A and 1B. However, instead of fixing the viewfinder portion 21 to the image capture portion 23 to form a swivel unit 26 (as shown in FIGS. 1A and 1B), the viewfinder portion 21' of the present embodiment is fixed to the base 33', as is fixed portion 32. As such, the image capture portion 23 is free to rotate without causing the viewfinder portion 21' to rotate.

While the invention has been described with reference to a preferred embodiment, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An image capture device for interactive use with a handheld device including an expansion slot, the image capture device comprising;
   an optical portion, including,
      a image capture portion including a digital image sensor, and
      a fixed portion said image capture portion being attached to said fixed portion,
      an indicator, a portion of which is fixed between said image capture portion and at least a portion of said fixed portion, said external light indicator including a generally disc shaped light pipe aligned with a light source, and
   a processor interface card sized to fit the expansion slot including a base at a first end and a connector at a second end, opposite said first end, said fixed portion being fixed to said base, said processor interface card additionally including a processor for processing an image received from said digital image sensor, said processor additionally controlling the state of said light source.

2. The image capture device of claim 1, wherein said generally disc shaped light pipe additionally includes a linear light pipe affixed to at least one side of said generally disc shaped light pipe.

3. The image capture device of claim 1, wherein said light source includes an LED.

4. The image capture device of claim 3, wherein said LED is a colored LED.

5. The image capture device of claim 3, wherein said generally disc shaped light pipe includes an irregularly shaped inner circumference which provides an increased number of reflective surfaces inside said light pipe.

6. A method of capturing and displaying an image using a handheld appliance including a display and an expansion slot, comprising the steps of:
   providing an image capture device, including an indicator comprising a generally disc shaped light pipe and a light source,
   inserting said image capture device processor interface card into the expansion slot;
   framing an image to be captured;
   actuating said physical trigger button to capture the image;
   storing said captured image; and
   displaying the captured image on the display of the handheld appliance.

7. The method of claim 6, wherein at least said image capture portion is rotatable, and further including the step of rotating said lens to point said lens in a desired direction.

8. The method of claim 7, wherein said image capture device additionally includes an indicator comprising a generally disc shaped light pipe and a light source.

9. The method of claim 8, including the step of lighting said indicator to indicate said image capture device is ready prior to actuation of said physical trigger button.

* * * * *